United States Patent
Delos Reyes et al.

(10) Patent No.: US 8,589,570 B2
(45) Date of Patent: Nov. 19, 2013

(54) DYNAMIC HANDLER FOR SIP MAX-SIZE ERROR

(75) Inventors: Emerando M. Delos Reyes, Pleasant Hill, CA (US); Samir Ait-Ameur, Fremont, CA (US); Imtiyaz Shaikh, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1015 days.

(21) Appl. No.: 12/540,664

(22) Filed: Aug. 13, 2009

(65) Prior Publication Data

US 2011/0040882 A1    Feb. 17, 2011

(51) Int. Cl.
    *G06F 15/16* (2006.01)
(52) U.S. Cl.
    USPC ............. 709/228; 340/2.8; 340/2.9; 370/431
(58) Field of Classification Search
    USPC .......... 715/753, 739, 727; 709/246, 230, 228, 709/227, 206, 204, 200, 217, 207, 203; 379/202.01; 370/389, 356, 355, 352; 726/6, 3, 13; 716/314, 313, 310
    See application file for complete search history.

(56) References Cited

U.S. PATENT DOCUMENTS

| | | | | |
|---|---|---|---|---|
| 2002/0141448 A1* | 10/2002 | Matsunaga | | 370/469 |
| 2003/0131079 A1* | 7/2003 | Neale et al. | | 709/220 |
| 2004/0107235 A1* | 6/2004 | Koskelainen | | 709/200 |
| 2009/0316698 A1* | 12/2009 | Menten | | 370/392 |
| 2011/0098051 A1* | 4/2011 | Kamalaraj et al. | | 455/450 |

* cited by examiner

*Primary Examiner* — David Lazaro
*Assistant Examiner* — Charles Murphy

(57) ABSTRACT

A network device forwards a Session Initiation Protocol (SIP) setup request from an originating user device toward a destination user device via multiple network elements and intercepts a message-too-large error message sent from one of the multiple network elements to the originating user device. The network device automatically splits the session setup request into smaller SIP messages, where a size of each of the smaller SIP messages is less than or equal to a particular size of message that the network element will accept. The network device then notifies another one of the multiple elements that the session setup request has been split into the smaller SIP messages and sends, via the multiple network elements, the smaller SIP messages toward the destination user device on behalf of the originating device.

20 Claims, 7 Drawing Sheets

| Originating Address | Destination Address | Next Hop Address | ... | Interface | Max-Size Value (bytes) |
|---|---|---|---|---|---|
| 103.219.240.122 | 130.209.240.128 | 130.255.240.0 | ... | 255.255.240.0 | 1472 |
| 113.219.240.122 | 130.209.220.136 | 130.255.240.0 | ... | 255.255.220.0 | 9216 |
| 113.220.232.131 | 130.209.220.136 | 130.255.240.0 | ... | 255.255.210.0 | 8192 |
| 113.220.232.131 | 130.209.240.128 | 130.245.420.0 | ... | 255.255.200.0 | 65535 |

FIG. 5

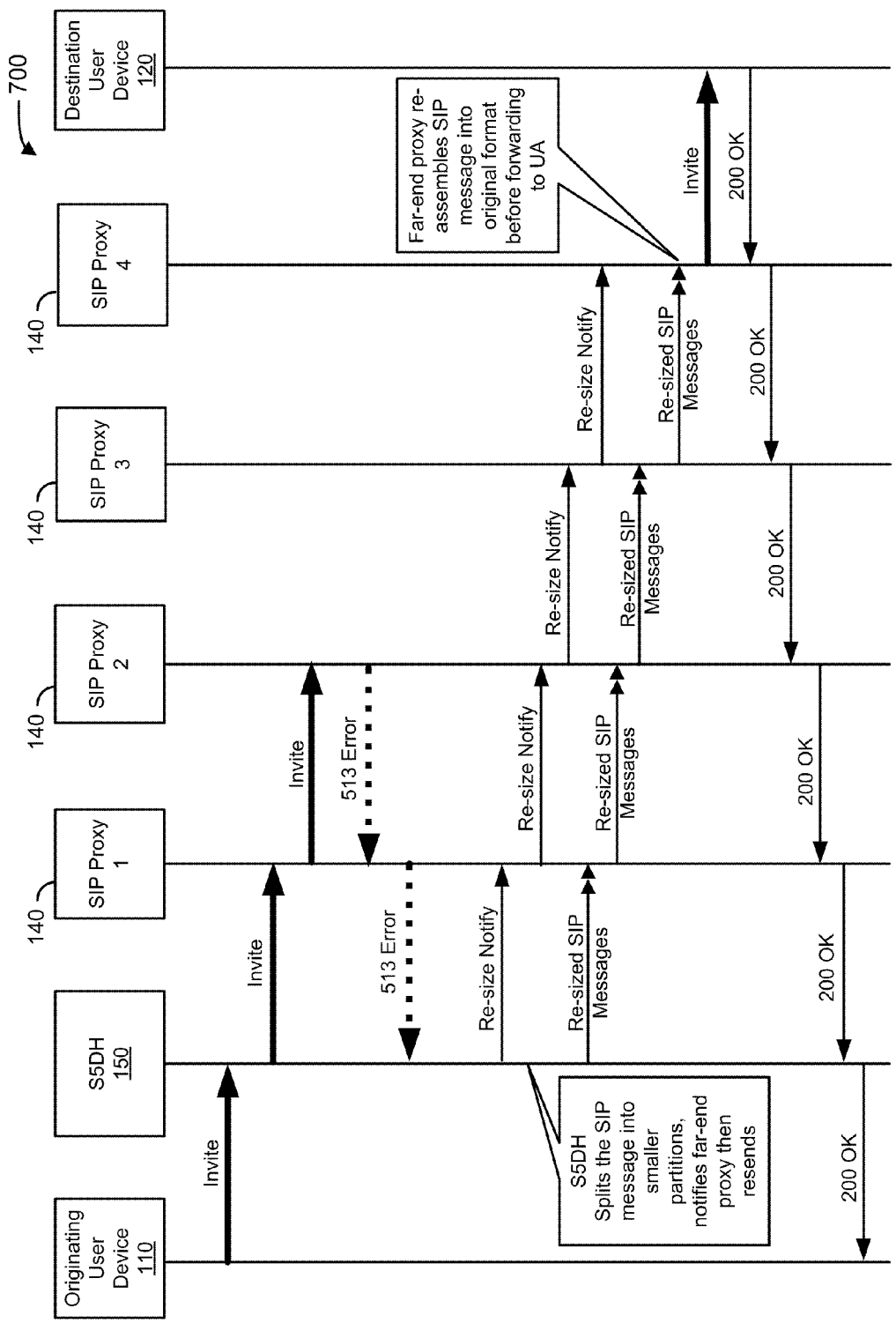

DYNAMIC HANDLER FOR SIP MAX-SIZE ERROR

BACKGROUND

Session Initiation Protocol (SIP) is an application-layer control (e.g., signaling) protocol for creating, modifying, and terminating sessions with one or more participants. These sessions may include Internet-based telephone calls, multimedia distribution, multimedia conferences, instant messaging conferences, interactive voice response (IVR) sessions, automated and manual operator services, automatic call distribution, call routing, etc. SIP invitations (or INVITES) may be used to create sessions and may carry session descriptions that allow participants to agree on a set of compatible media types. SIP may use proxy servers to help route requests to a user's current location, authenticate and authorize users for services, implement provider call-routing policies, and/or provide other features to users.

SIP can be transmitted over multiple transport protocols, including Transmission Control Protocol (TCP) and User Datagram Protocol (UDP). With SIP, each end-to-end transmission is negotiated on a hop-by-hop manner. Each network element (e.g., a SIP proxy or SIP server) can determine which transport protocol to use. For example, a network element may use TCP to talk to the originating device and use UDP to transmit that same traffic to the next hop, and so forth. Since UDP typically has less overhead compared to other transport protocols, UDP may be a preferred method for transmitting low bandwidth applications, such as mobile voice or text messages. However, UDP is not a connection-oriented protocol and does not negotiate for end-to-end communication. Therefore, UDP is inherently prone to congestion problems. UDP does not have a mechanism to detect, prevent, or avoid congestion. This could become problematic when used with SIP.

Network elements using SIP may enforce a limit on the maximum size (or length) of a message to a destination. For example, a network element that detects an incoming SIP message that exceeds UDP size limits will return a "513— message too large" error message to the message originator, thus failing to deliver the incoming SIP message. A "513— message too large" error is defined by the Internet Engineering Task Force's (IETF) Request for Comments (RFC) 3261 (Section 21.5.7). The maximum size of a message is limited based on the ability of a SIP proxy server to process the SIP request. When a SIP proxy server receives a request containing a message size that exceeds the maximum size for the proxy server, the proxy server returns a "513—message too large" error response to the message originator. The SIP proxy server then ends the request; hence failing the SIP session setup.

BRIEF DESCRIPTION OF THE DRAWINGS

FIG. 5 depicts portions of an exemplary data structure that may be stored in the SIP 513 dynamic handler;

FIG. 7 is a diagram illustrating an exemplary communication flow for a SIP INVITE message encountering a "513— message too large" error according to implementations described herein.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Systems and/or methods described herein may prevent a SIP call request failure due to a message-too-large error (e.g., a SIP "513—message too large" error, or "513 error"). In implementations described herein, a SIP 513 dynamic handler ("S5DH") may intercept a 513 error message from any SIP proxy or server in an associated network on every SIP session establishment. Upon receiving the 513 error message, the S5DH may dynamically determine an optimum SIP message size that can be allowed to traverse across the network. The S5DH may notify the far-end SIP proxy/server (i.e., the last proxy/server in the SIP network before the SIP message is delivered to a destination) that the SIP message will be transmitted in a stream of smaller partitions. The far-end SIP proxy/server may re-assemble the message back to the original format and forward the re-assembled message to the destination user device. Implementations described herein may also optimize the flow of succeeding SIP messages to the same destination by storing the optimum value of the SIP message size into a memory associated with the S5DH.

Figure 1:
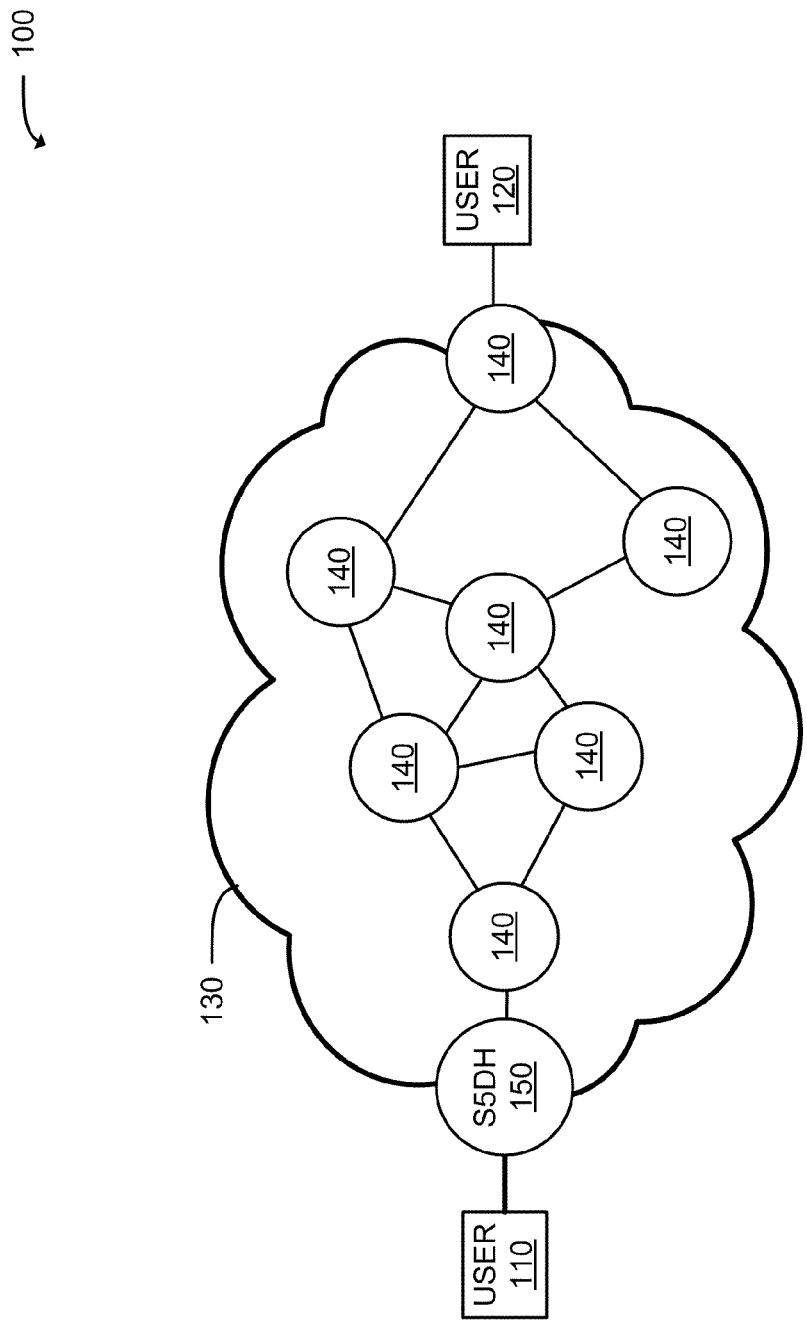
FIG. 1 is a diagram of an exemplary network in which systems and/or methods described herein may be implemented.

FIG. 1 provides a diagram of an exemplary network 100 in which systems and/or methods described herein may be implemented. As shown in FIG. 1, network 100 may include an originating user device 110 and a destination user device 120 connected by a SIP network 130 that facilitates communication between originating user device 110 and destination user device 120. SIP network 130 may include multiple network elements 140 (referred to herein individually as "network element 140") and a SIP 513 dynamic handler (S5DH) 150. For simplicity, one originating user device 110, one destination user device 120, one SIP network 130, one S5DH 150, and several network elements 140 have been illustrated in FIG. 1. In practice, there may be more originating user devices, destination user devices, SIP networks, and/or S5DHs, and more or fewer network elements. Also, in some instances, one or more of the components of network 100 may perform one or more functions described as being performed by another one or more of the components of network 100.

Originating user device 110 may include a SIP-based device. Destination user device 120 may be similarly configured. For example, originating user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a voice-over-IP (VoIP)-based device, or other types of computation or communication devices. In some implementations, originating user device 110 may include a user agent that has instructions for causing originating user device 110 to implement SIP signaling on behalf of originating user device 110. In doing so, the user agent may include instructions to cause originating user device 110 to assign a port number for a SIP session, such as a call between originating user device 110 and destination user device 120. The user agent may create, modify, or terminate sessions with participants of the session, such as destination user device 120.

SIP network 130 may include a SIP-based local area network (LAN), a SIP-based wide area network (WAN), a SIP-based metropolitan area network (MAN), a SIP-based intranet, the Internet, a VoIP-based network, or a combination of SIP-based networks. SIP network 130 may generally be operable according to the standards defined by the 3GPP to allow service providers to manage a variety of services that can be delivered via IP over any network type, where IP is used to transport both bearer traffic and SIP-based signaling traffic. SIP network 130 may include multiple layers (e.g., a services/application layer, an IP multimedia subsystem (IMS) layer, a transport layer, etc.) that include a variety of network elements to deliver applications and/or services for use by user devices 110/120. Exemplary services may include caller identification (ID)-related services, call waiting, call holding, push-to-talk, conference call services, voicemail, instant messaging, call blocking, and call forwarding.

Network element 140 may include a device, such as a SIP server, SIP proxy server, or gatekeeper, that facilitates the establishment of SIP calls. A "SIP call" may include any out-of-dialog or dialog-establishing SIP method (e.g., a SIP INVITE request or message, a SIP SUBSCRIBE request, a SIP REFER request, a SIP OPTIONS request, a SIP MESSAGE request, a SIP REGISTER request, etc.). Network element 140 may act as both a server and a client for the purpose of making requests on behalf of other clients. Network element 140 may service requests internally or pass them on, possibly after translation, to other servers. Network element 140 may interpret, and, if necessary, rewrite a request message before forwarding the request message.

In one example, certain network elements 140 may be owned and/or managed by a particular carrier that is different than the carrier that owns and/or manages other certain network elements 140. Network elements 140 may further include one or more gateways. For example, network elements 140 may include gateways to interface SIP network 130 with parts of a wired network, such as the public switched telephone network (PSTN).

S5DH 150 may include one or more servers, or other types of computation or communication devices, that gather, process, search, and/or provide information in a manner described herein. In one implementation, S5DH 150 may include a server (e.g., a computer system) with multiple modules to optimize and prevent a SIP session setup from failing to establish the call setup. In an exemplary implementation, S5DH 150 may be deployed within one or more network elements 140 or within another node of SIP network 130. S5DH 150 may be implemented as a single server device, or S5DH 150 may be implemented across multiple server devices (e.g., a distributed system). As described further herein, S5DH 150 may forward SIP requests from originating user device 110 and intercept a SIP "513—message too large" error message, being sent to originating user device 110. In another implementation, S5DH 150 may store a calculated maximum size (or "max-size") value for a particular SIP request to optimize the flow of subsequent SIP call requests. S5DH 150 is described in more detail with respect to, for example, FIGS. 3 and 4.

In an error-free operation of network 100, originating user device 110 may send a SIP session setup request through SIP network 130 to initiate a SIP call with destination user device 120. The SIP session setup request and other messages exchanged within network 100 may be, for example, in the form of a packet of data having both header and payload information.

A SIP session setup request from originating user device 110 may be initially received at S5DH 150, which may forward the SIP session setup request toward destination user device 120 via network elements 140. In response to the received SIP session setup request, destination user device 120 may send a SIP response message having a similar session description portion to originating user device 110 via network elements 140 and S5DH 150. When originating user device 110 receives the response message, originating user device 110 may forward an acknowledgement message to destination user device 120. This acknowledgement message may complete the SIP call setup and enable subsequent exchange of real-time media directly between the originating user device 110 and destination user device 120.

Figure 2:
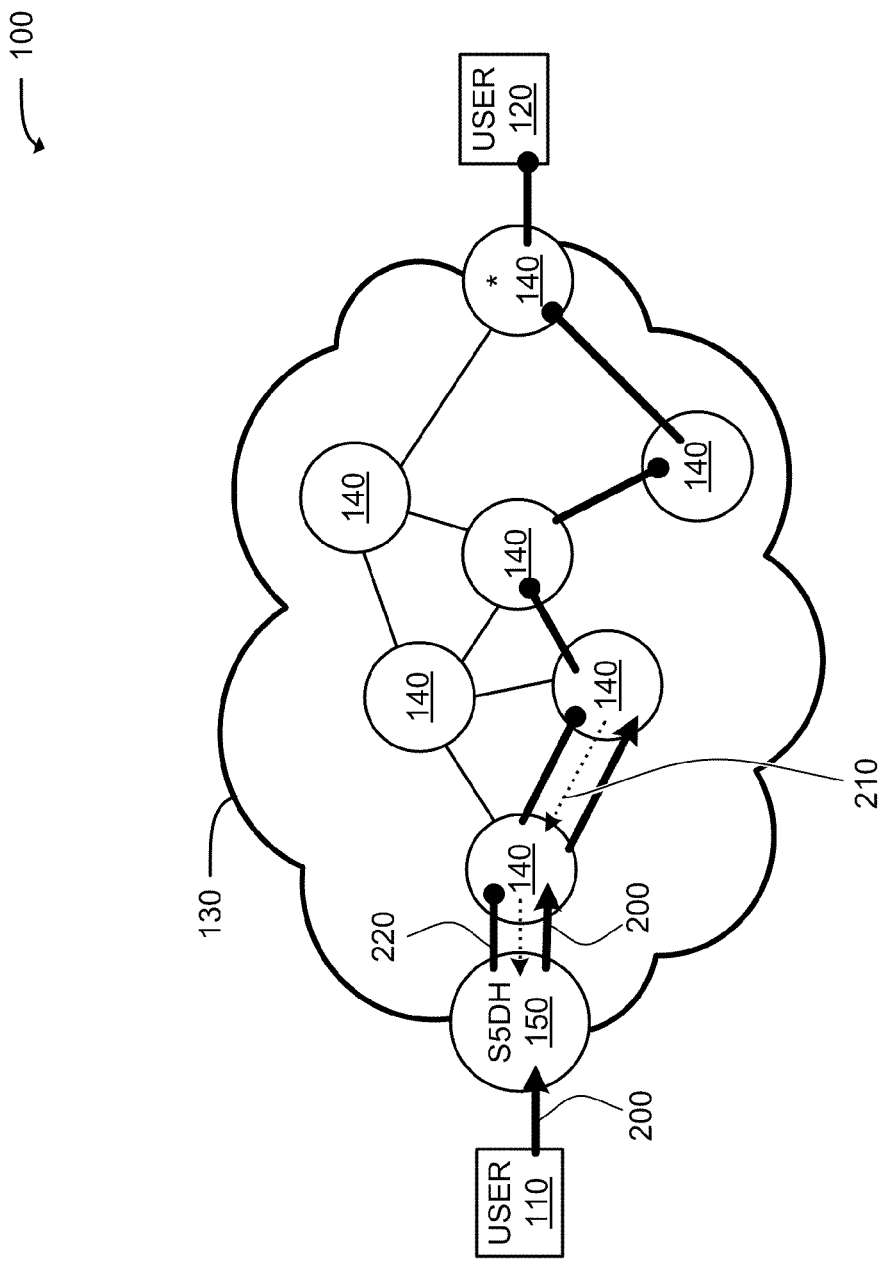
FIG. 2 depicts a diagram of exemplary interactions among components of the network illustrated in FIG. 1.

FIG. 2 provides a diagram of exemplary interactions among components of network 100 when a SIP "513—message too large" error occurs. As shown, originating user device 110 may send a SIP session setup request 200 to destination user device 120. S5DH 150 may receive SIP session setup request 200 from originating user device 110 and may forward SIP session setup request 200 toward destination user device 120 via selected network elements 140 in SIP network 130. After the SIP session setup request 200 is forwarded to SIP network 130, S5DH 150 can monitor SIP session setup request 200 and wait for a response from destination user device 120.

As further shown in FIG. 2, a SIP response 210 may be provided to S5DH 150. SIP error message 210 may be associated with destination user device 120 and may contain a SIP "513—message too large" error, indicating that SIP session setup request 200 exceeded a size limit of a network element 140 before SIP session setup request 200 reached destination user device 120. A response from SIP network 130 containing a "513—message too large" error may indicate that a network element 140 within SIP network 130 is not able to process the SIP request because the SIP message size is too big to fit into the transport protocol being used by at least one of the transit network elements 140.

S5DH 150 may then examine the 513 error message to determine the maximum SIP message size that the network element 140 can process to reach destination user device 120. Alternatively, S5DH 150 can also invoke a SIP Message Size Throttle Back (SIP-MSTB) mechanism, such that S5DH 150 proportionally partitions the SIP message into a particular number of message segments. (For example, if the pre-configured SIP-MSTB number is 4, S5DH 150 can dynamically partition the SIP message into 4 segments.)

Once S5DH 150 determines the maximum message size required for setup request 200 to reach destination user device 120, S5DH 150 may notify the far-end network element 140 (e.g., the last network element 140 in SIP network 130 before the SIP message is delivered to destination user device 120— marked with an "*" in FIG. 2) that S5DH 150 will split setup request 200 into more than one partition to fit the determined maximum SIP message size. The notification from S5DH 150 may enable the far-end network element 140 to anticipate that setup request 200 will be partitioned and will require re-assembly. S5DH 150 may then stream partitioned SIP messages 220 (e.g., segments that include setup request 200) across SIP network 130. The far-end network element 140 may receive partitioned SIP messages 220 and re-assemble partitioned SIP messages 220 back to the original format of setup request 200 before forwarding to destination user device 120.

Figure 3:
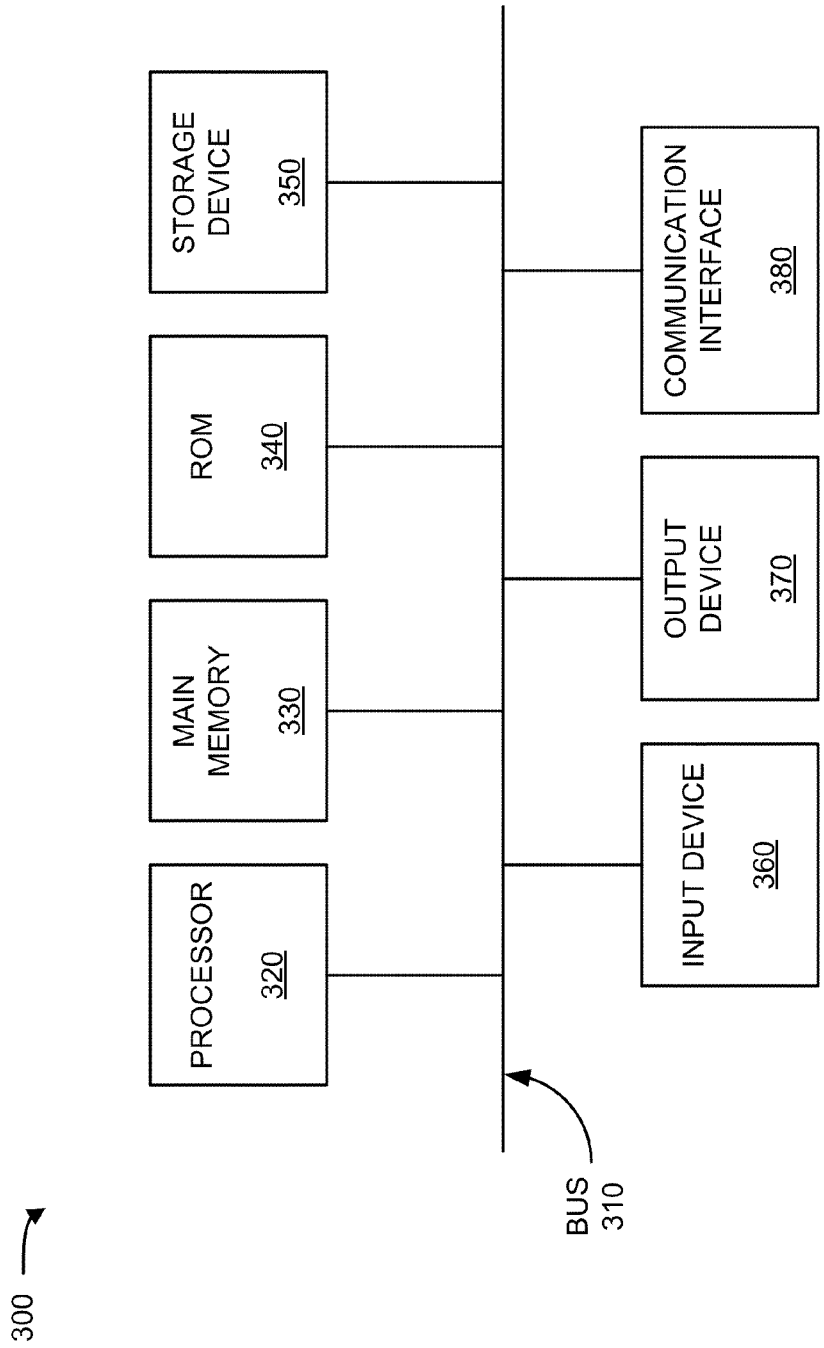
FIG. 3 illustrates exemplary components of network elements and/or a SIP 513 dynamic handler of the network depicted in FIGS. 1 and 2.

FIG. 3 provides an exemplary diagram of a device 300 that may correspond to one or more network elements 140 and/or S5DH 150. As illustrated, device 300 may include a bus 310, a processor 320, a main memory 330, a read-only memory (ROM) 340, a storage device 350, an input device 360, an output device 370, and/or a communication interface 380. Bus 310 may include a path that permits communication among the components of device 300.

Processor 320 may include one or more processors, microprocessors, or other types of processing devices that may interpret and execute instructions. Main memory 330 may include one or more random access memories (RAMs) or another type of dynamic storage device that may store information and instructions for execution by processor 320. ROM 340 may include one or more ROM devices or another type of static storage device that may store static information and/or instructions for use by processor 320. Storage device 350 may include one or more magnetic and/or optical recording media and their corresponding drives.

Input device 360 may include one or more mechanisms that permit an operator to input information to device 300, such as a keyboard, a mouse, a pen, a microphone, voice recognition and/or biometric mechanisms, etc. Output device 370 may include one or more mechanisms that output information to the operator, including a display, a printer, a speaker, etc. Communication interface 380 may include any transceiver-like mechanisms that enable device 300 to communicate with other devices and/or systems. For example, communication interface 380 may include mechanisms for communicating with another device or system via a network, such as SIP network 130.

As described herein, device 300 may perform certain operations in response to processor 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
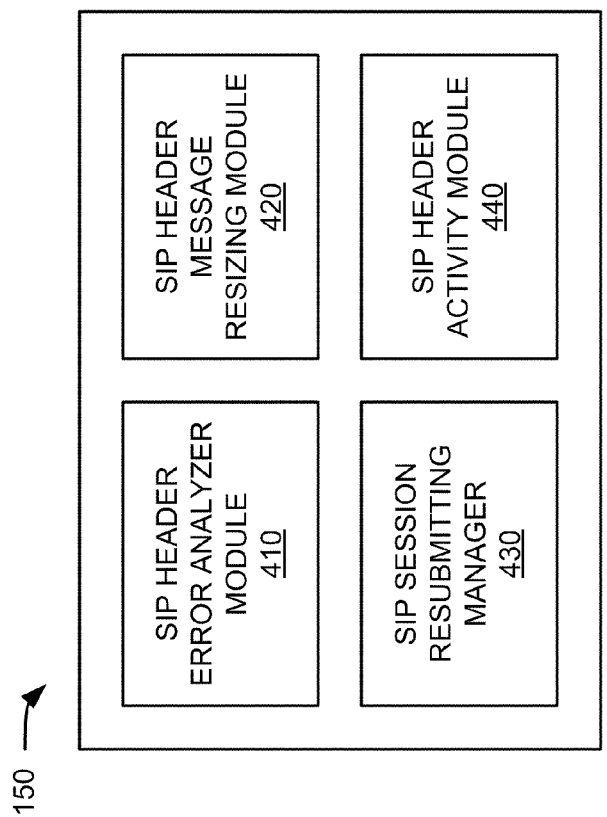
FIG. 4 depicts a diagram of exemplary functional components of the SIP 513 dynamic handler of FIGS. 1 and 2.

FIG. 4 depicts a diagram of exemplary functional components of S5DH 150. As shown in FIG. 4, S5DH 150 may include a SIP header error analyzer module 410, a SIP header message resizing module 420, a SIP session resubmitting manager 430, and a SIP header activity module 440. In one implementation, SIP header error analyzer module 410, SIP header message resizing module 420, SIP session resubmitting manager 430, and SIP header activity module 440 may be implemented within processor 320 and/or memory 330 of S5DH 150.

SIP header error analyzer module 410 may include hardware or a combination of hardware and software to analyze the types and sources of incoming error messages. SIP header error analyzer module 410 may categorize the frequency of each type of error along with the error source and intended SIP message destination. SIP header error analyzer module 410 may receive incoming SIP requests and determine if a max-size value associated with the destination user agent (e.g., destination user device 120) identified in the SIP request is stored in a memory (e.g., memory 330). SIP header error analyzer module 410 may monitor the SIP call and intercept responses from the destination user agent and/or from intervening network elements 140, including any "513—message too large" error messages. SIP header error analyzer module 410 may also determine an allowable SIP message size (e.g., a message size below the max-size value) for each message in which a 513 error is received. For example, SIP header error analyzer module 410 may review information in the header and/or message body to identify a max-size value.

SIP header message resizing module 420 may include hardware or a combination of hardware and software to receive analyzed data from SIP header error analyzer module 410 and resize SIP messages by splitting the data into smaller partitions that can be handled by network elements 140 within SIP network 130. SIP header message resizing module 420 may, for example, partition setup request 200 into a stream of partitioned SIP messages 220 that are less than or equal to the max-size value determined by SIP header error analyzer module 410. SIP header message resizing module may also count the number of partitioned messages into which the original SIP message was divided.

SIP session resubmitting manager 430 may include hardware or a combination of hardware and software to receive a request from SIP header message resizing module 420 indicating that a SIP message has been partitioned for retransmission. SIP session resubmitting manager 430 may notify the far-end network element 140 that subsequent SIP messages may be partitioned and provide the count of the number of messages into which the original SIP message was divided. SIP session resubmitting manager 430 may then re-transmit the partitioned SIP message toward the destination user device 120. The far-end network element 140 may use the notification and the count of the number of messages to reassemble the original SIP message and forward reassembled SIP message to the destination user device 120.

SIP header activity module 440 may include hardware or a combination of hardware and software to store and process all SIP error messages that might occur during the SIP setup process for a particular SIP call. SIP header activity module 440 may check if the same type of 513 error occurred during a SIP session setup, and, if so, SIP header activity module 440 may feed the error message back to SIP header error analyzer module 410 for reprocessing in order to successfully complete the SIP session setup.

Although FIG. 4 shows exemplary functional components of S5DH 150, in other implementations, S5DH 150 may contain fewer, different, differently-arranged, or additional functional components than depicted in FIG. 4. In still other implementations, one or more functional components of S5DH 150 may perform one or more other tasks described as being performed by one or more other functional components of S5DH 150.

FIG. 5 depicts portions of an exemplary data structure 500 that may be stored in, or accessible by, S5DH 150. Data structure 500 may be used by S5DH 150 to confirm and/or correct the message size of a SIP setup request from a particular originator (e.g., originating user device 110) to a particular destination (e.g., destination user device 120). Data structure 500 may be implemented in a single database, in multiple databases, or as one or more tables.

As illustrated in FIG. 5, data structure 500 may include a variety of information associated with a SIP setup request. For example, data structure 500 may include an originating address field 510, a destination address field 520, a next hop address field 530, an additional information field 540, an interface field 550, a max-size value field 560, and a variety of records or entries 570 associated with fields 510-560.

Originating address field 510 may include an IP address, URI, or other indicator for an originating user agent, such as originating user device 110. Destination address field 520 may include an IP address, URI or other indicator for the destination of a SIP session request, such as destination user device 120. Next hop address field 530 may include an IP address to which any packet trying to reach the address in destination address field 520 should be sent.

Additional information field 540 may include one or more fields that store additional information to optimize the flow of subsequent SIP session requests. Additional information field 540 may include other information relevant to transmission of a SIP session request, such as, for example, best path information and/or other restrictions (e.g., max-hop counts for the SIP request, etc.) for the address in destination address field 520. Interface field 550 may include an identifier of a network interface (e.g., communication interface 380) of S5DH 150 on which a packet (e.g., an SIP setup request) for the address in destination address field 520 should be forwarded.

Max-size value field 560 may include a particular number of bytes to which a SIP message may be limited to reach the address in destination address field 520. Max-size value field 560 may be determined, for example, by SIP header error analyzer module 410 of S5DH 150 from information contained within a 513 error.

Although FIG. 5 shows exemplary information that may be provided in data structure 500, in other implementations, data structure 500 may contain less, different, differently-arranged, or additional information than depicted in FIG. 5.

Figure 6:
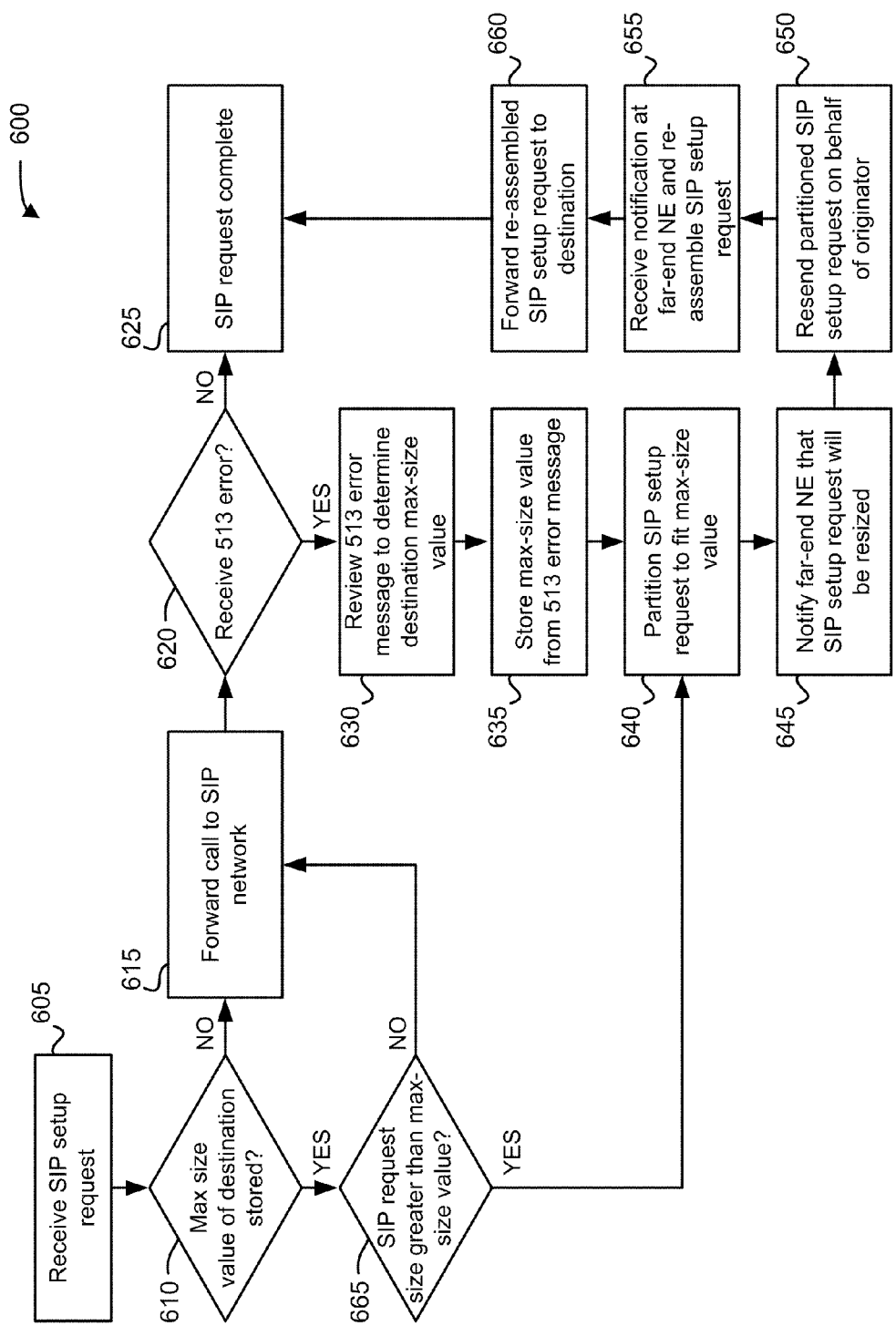
FIG. 6 is a flow diagram illustrating an exemplary process for managing a "513-message too large" error during a SIP call request.

FIG. 6 depicts a flow diagram illustrating an exemplary process 600 for managing a "513—message too large" error during a SIP call according to implementations described herein. In one implementation, process 600 may be performed by S5DH 150. In another implementation, some or all of process 600 may be performed by another device or group of devices, including or excluding S5DH 150.

As illustrated in FIG. 6, process 600 may include receiving a SIP setup request (block 605) and determining if a max-size value of a destination is stored (block 610). For example, S5DH 150 may receive a SIP setup request from originating user device 110. S5DH 150 (e.g., SIP header error analyzer module 410) may then determine if a max-size value of the destination user agent (e.g., user device 120) identified in the SIP request is stored in a memory (e.g., table 500 of memory 330).

If a max-size value for the destination is not stored (block 610—NO), then the call may be forwarded to a SIP network (block 615). For example, S5DH 150 (e.g., SIP session resubmitting manager 430) may forward the SIP request to a network element 140 within SIP network 130 for transmission to destination user device 130.

It may be determined if a 513 error is received (block 620). For example, S5DH 150 (e.g., SIP header error analyzer module 410) may monitor the SIP call and intercept responses from the destination user agent (e.g., destination user device 120) or from intervening network elements 140. S5DH 150 (e.g., SIP header error analyzer module 410) may screen the responses for any "513—message too large" error messages. If a 513 error is not received (block 620—NO), a SIP session setup may be complete (block 625). For example, S5DH 150 (e.g., SIP header error analyzer module 410) may no longer monitor SIP traffic relating to the established SIP session if a 513 error is not received or if a successful response from the destination user agent is received.

If a 513 error is received (block 620—YES), the 513 error message may be reviewed to determine a max-size value (block 630). For example, S5DH 150 (e.g., SIP header error analyzer module 410) may examine the 513 error message to determine the maximum SIP message size that SIP network 130 can process (at least as far as the network element 140 that generated the 513 error message) for destination user device 120. Alternatively, S5DH 150 can automatically invoke a SIP-MSTB mechanism, such that S5DH 150 can proportionally partition the SIP message into a particular number of segments whenever a 513 error message is received.

The max-size value from the 513 error message may be stored (block 635). For example, S5DH 150 (e.g., SIP header activity module 440) may receive the max-size value for destination user device 120 and store the correct max-size value in table 500.

The SIP setup request may be partitioned to fit the max-size value (block 640). For example, S5DH 150 (e.g., SIP header message resizing module 420) may partition the original SIP setup request into either an optimal number (e.g., a minimal number of partitions required to match the max-size value stored in table 500) of messages or a particular (e.g., predetermined) number of messages.

A far-end network element ("NE") may be notified that the SIP setup request will be resized (block 645). For example, S5DH 150 (e.g., SIP session resubmitting manager 430) may notify the last network element 140 in SIP network 130 preceding destination user device 120. The notification may include an indication that the original SIP setup request will be resized and identify the number of message partitions to follow.

The partitioned SIP setup request may be sent on behalf of the originator (block 650). For example, S5DH 150 (e.g., SIP session resubmitting manager 430) may re-transmit the partitioned SIP message via SIP network 130 toward the destination user device 120. The partitioned SIP message may include, for example, header information consistent with the original SIP setup request to indicate the originating user device.

The notification may be received at the far-end network element and the SIP setup request reassembled (block 655) and the re-assembled SIP setup request may be forwarded to the destination (block 660). For example, the last network element 140 in SIP network 130 preceding destination user device 120 may receive the indication that the original SIP setup request was resized into a particular number of smaller message partitions. The last network element 140 may receive each of the smaller message partitions and reassemble the message partitions into the original SIP setup request. Once the SIP setup request has been re-assembled as a single message, the last network element 140 may forward the SIP setup request to destination user device 120.

Once the re-assembled SIP setup request is sent, the call setup may be completed (block 625). S5DH 150 may, thus, resolve the "513—message too large" error message without intervention from the originating UA (e.g., originating user device 110) or intervention from a network administrator.

Returning to block 610, if a max-size value for the destination is stored (block 610—YES), then it may be determined if the SIP request size is greater than the max-size value (block 665). For example, S5DH 150 (e.g., SIP header error analyzer module 410) may compare the message length of the SIP setup request with the max-size value stored in memory 330 (e.g., table 500). If the SIP request size is not greater than the max-size value (block 665—NO), the call may be forwarded to the SIP network (block 615) and process 600 may continue from block 615 as described above. If the SIP request size is greater than the max-size value (block 665—YES), the SIP setup request may be partitioned to fit the max-size value (block 640) and process 600 may continue from block 640 as described above.

FIG. 7 is a diagram illustrating an exemplary communication flow for a SIP INVITE message encountering a "513-message too large" error according to implementations described herein. As shown in FIG. 7, a SIP INVITE message may flow from originating user device 110 toward destination user device 120. The SIP INVITE message may pass through a SIP network that includes S5DH 150 and multiple network elements 140. Although four network elements 140 ("SIP Proxy 1," "SIP Proxy 2," "SIP Proxy 3," and "SIP Proxy 4") are shown in the example of FIG. 7, more or fewer network elements 140 may be included in other implementations.

Referring to FIG. 7, a SIP INVITE message may be sent from originating user device 110 toward destination user device 120 via the SIP network. Assume that the SIP INVITE message size is 9600 bytes and that the second network element 140 ("SIP Proxy 2") can only accept message sizes up to 9216 bytes, while the other network elements (e.g., "SIP Proxy 1," "SIP Proxy 3," and "SIP Proxy 4") can accept larger message sizes than 9600 bytes. Also, assume that S5DH 150 does not have a log (e.g., from SIP header activity module 440) of previous SIP requests between originating user device 110 and destination user device 120.

The SIP INVITE message may pass through S5DH 150 to the first network element 140 ("SIP Proxy 1") and then to the second network element 140 ("SIP Proxy 2"). Because the SIP INVITE message size (9600 bytes) exceeds the max-size value (9216 bytes) for the second network element 140, the second network element 140 may not forward the SIP INVITE message. Instead, the second network element 140 may return a "513—message too large" error message toward originating user device 110. The 513 error message may pass through the first network element ("SIP Proxy 1") and can be intercepted by S5DH 150.

S5DH 150 (e.g., SIP header error analyzer module 410) may review the 513 error message to determine the maximum message size that the second network element 140 will accept. S5DH 150 may, for example, identify the max-size value of 9216 bytes for the second network element 140 ("SIP Proxy 2") and partition the SIP INVITE message into two smaller messages (e.g., of 9216 bytes and 384 bytes). Alternatively, S5DH 150 may automatically partition the SIP INVITE message to a particular number of smaller SIP messages (e.g., divide the SIP INVITE message into 4 equally-sized messages).

S5DH 150 may send two types of messages in response to the intercepted 513 error message. First, S5DH 150 may send a re-size notify message directed to the far-end network element 140 ("SIP Proxy 4) to inform far-end network element 140 that the SIP INVITE message will be divided into, for example, two smaller messages. The re-size notification message may be smaller than the max-size value for the second network element 140 (e.g., 9216 bytes or less for "SIP Proxy 2"), and may pass through each intervening network element 140 (e.g., "SIP Proxy 1," "SIP Proxy 2," and "SIP Proxy 3") to the far-end network element 140 ("SIP Proxy 4"). Next, S5DH 150 may send the re-sized SIP messages (e.g., of 9216 bytes and 384 bytes) on behalf of originating user device 110. The re-sized SIP messages may pass through each intervening network element 140 (e.g., "SIP Proxy 1," "SIP Proxy 2," and "SIP Proxy 3") to the far-end network element 140 ("SIP Proxy 4").

Far-end network element 140 ("SIP Proxy 4") may re-assemble the re-sized SIP messages into the original SIP INVITE message. The re-assembled SIP INVITE message may be forwarded to destination user device 120. A SIP response message ("200 OK") may be sent from destination user device 120, through each intervening network element 140 (e.g., "SIP Proxy 4," "SIP Proxy 3," "SIP Proxy 2," and "SIP Proxy 1"), through S5DH 150, and to originating user device 110.

Systems and/or methods described herein may forward a SIP setup request from an originating user device toward a destination user device and intercept a "513—message-too-large" error message sent from a network element (in the path from the originating device to the destination device) to the originating user device. The network device may automatically split the SIP setup request into smaller SIP messages that are within a max-size value for the network element. The network device may notify a far-end network element that the SIP setup request has been split into smaller SIP messages and may send the smaller SIP messages toward the destination user device on behalf of the originating device. The far-end network device may then re-assemble the original SIP setup request and forward the original SIP setup request to the destination user device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks and communications have been described with respect to FIGS. 6 and 7, the order of the blocks and communications may be modified in other implementations. Further, non-dependent blocks and/or communications may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   forwarding, and by a computer device, a session setup request from an originating device toward a destination device via a plurality of network elements;

intercepting, by the computer device, an error message sent from a first network element, of the plurality of network elements, to the originating device,
the error message indicating that a size of the session setup request is too large for the first network element;
splitting, by the computer device and based on the error message, the session setup request into a plurality of smaller SIP messages,
each of the plurality of smaller SIP messages being smaller than or equal to a particular size that the first network element accepts;
transmitting, by the computer device and to a second network element of the plurality of network elements, a notification that indicates that the session setup request has been split by the computer device into the plurality of smaller SIP messages,
the second network element being different from the first network element, and
the computer device being different from the originating device, the first network element, and the second network element; and
sending, by the computer device and via the plurality of network elements, the plurality of smaller SIP messages toward the destination device.

2. The method of claim 1, further comprising:
determining, based on the error message, the particular size that the first network element accepts; and
storing the particular size that the first network element accepts with an identifier associated with the destination device.

3. The method of claim 2, further comprising:
receiving, from the originating device, another session setup request for the destination device;
determining the particular size based on the identifier associated with the destination device;
comparing a size of the other session setup request to the particular size;
splitting the other session setup request into other smaller SIP messages when the size of the other session setup request is larger than the particular size,
each of the other smaller SIP messages being smaller than or equal to the particular size;
notifying the second network element that the other session setup request has been split into the other smaller SIP messages; and
sending the other smaller SIP messages toward the destination device.

4. The method of claim 2, where the particular size is included in a data structure with other particular sizes of messages that other network elements accept.

5. The method of claim 1, where splitting the session setup request into the plurality of smaller SIP messages comprises:
proportionally partitioning the session setup request into a particular number of the plurality of smaller SIP messages that are of equal size.

6. The method of claim 1, where the first network element utilizes a User Datagram Protocol (UDP).

7. The method of claim 1, further comprising:
receiving the session setup request from the originating device.

8. The method of claim 1, further comprising:
providing, to the second network element, information regarding a quantity of the plurality of smaller SIP messages.

9. The method of claim 1, further comprising:
receiving a SIP response message from the destination device,
the SIP response message being a response to the session setup request; and
forwarding the SIP response message to the originating device.

10. A method comprising:
receiving, by a first network element, a session setup request being sent from an originating device toward a destination device;
determining, by the first network element, whether a size of the session setup request is greater than a stored maximum message size associated with the destination device;
partitioning, by the first network element, the session setup request into a plurality of smaller SIP messages when the size of the session setup request is greater than the stored maximum message size,
each of the plurality of smaller SIP messages being smaller than or equal to the stored maximum message size;
transmitting, by the first network element and to a second network element that is located between the first network element and the destination device, a notification that indicates that the session setup request has been partitioned by the first network element into the plurality of smaller SIP messages,
the first network element being different from the second network element and the originating device; and
sending, by the first network element, the plurality of smaller SIP messages toward the destination device.

11. The method of claim 10, where the stored maximum message size is included in a data structure with stored maximum message sizes that are associated with other network elements.

12. The method of claim 10, further comprising:
receiving a SIP response message from the destination device,
the SIP response message being a response to the session setup request; and
forwarding the SIP response message to the originating device.

13. A device comprising:
a processor to:
intercept an error message sent from a first network element to an originating device,
the error message indicating that a size of a session setup request is too large for the first network element;
partition, based on the error message, the session setup request into a plurality of SIP messages;
transmit, to a second network element, a notification that indicates that the session setup request has been partitioned by the device into the plurality of SIP messages,
the second network element being different from the first network element, and
the device being different from the originating device, the first network element, and the second network element; and
send the plurality of SIP messages toward a destination device via the first network element and the second network element.

14. The device of claim 13, where, when partitioning the session setup request into the plurality of SIP messages, the processor is to:
determine, based on the error message, a maximum message size that the first network element accepts; and partition, based on the maximum message size, the session setup request into the plurality of SIP messages,
each of the plurality of SIP messages being smaller than or equal to the maximum message size.

15. The device of claim 13, where, when partitioning the session setup request into the plurality of SIP messages, the processor is to:
proportionally partition the session setup request into a particular number of the plurality of smaller SIP messages that are of equal size.

16. The device of claim 13, where the processor is further to:
receive the session setup request being sent from the originating device toward the destination device;
forward the session setup request toward the destination device via the first network element;
receive a SIP response message from the destination device,
the SIP response message being a response to the session setup request; and
forward the SIP response message to the originating device.

17. A non-transitory computer-readable medium storing instructions, the instructions comprising:
one or more instructions that, when executed by at least one processor of a computing device, cause the at least one processor to:
receive a Session Initiation Protocol (SIP) session setup request sent from an originating device toward a destination device;
forward the session setup request toward the destination device via a plurality of network elements;
intercept an error message sent from a first network element, of the plurality of network elements, to the originating device;
partition, based on the error message, the session setup request into a plurality of SIP messages;
transmit, to a second network element of the plurality of network elements, a notification that indicates that the session setup request has been split by the computing device into the plurality of SIP messages,
the second network element being different from the first network element, and
the computing device being different from the originating device, the first network element, and the second network element; and
send the plurality of SIP messages toward the destination device via the plurality of network elements.

18. The non-transitory computer-readable medium of claim 17, where the instructions further comprise:
one or more instructions that, when executed by the at least one processor, cause the at least one processor to:
receive a SIP response message from the destination device,
the SIP response message being a response to the SIP session setup request;
forward the SIP response message to the originating device.

19. The non-transitory computer-readable medium of claim 17, where the instructions further comprise:
one or more instructions that, when executed by the at least one processor, cause the at least one processor to:
provide, to the second network element, information identifying a quantity of the plurality of SIP messages.

20. The non-transitory computer-readable medium of claim 17, where the notification includes information for reassembling the plurality of SIP messages into the session setup request.

* * * * *